United States Patent Office 3,288,671
Patented Nov. 29, 1966

3,288,671
METHOD OF CONTROLLING PESTS WITH ORGANOTHIOPHOSPHATE DERIVATIVES OF HALOGENATED CYCLIC SULFONES
Sheldon B. Greenbaum, Tonawanda, N.Y., assignor to Hooker Chemical Corporation, Niagara Falls, N.Y., a corporation of New York
No Drawing. Filed Mar. 8, 1965, Ser. No. 438,029
5 Claims. (Cl. 167—33)

This is a continuation-in-part of my application Serial Number 414,832, filed November 30, 1964, and issued as U.S. Patent 3,228,965, on January 11, 1966.

This invention relates to novel organophosphorus derivatives of cyclic sulfones useful as pesticides. More particularly, this invention relates to the use of new organophosphorus derivatives of cyclic chlorinated or brominated sulfones having contact and systemic toxicity toward insects.

The compositions of this invention have the structure:

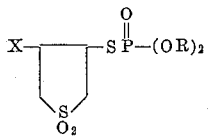

wherein the R's are independently selected from the group consisting of a lower alkyl radical and X is bromine or chlorine. The alkyl radicals or groups herein may have from one to four carbon atoms and may be branched or unbranched. Preferred alkyls are methyl, ethyl, propyl, isopropyl, butyl, isobutyl and tertiary butyl. Mixtures of such substituents may be present. Most preferred is the compound wherein both R's are ethyl and the halogen is chlorine.

The terms "insecticide" and "insect" as used herein refer to their broad and commonly understood usage rather than to those creatures which, in the strict biological sense, are classified as insects. Thus, the term "insect" is used not only to include those small invertebrate animals belonging mostly to the class Insects comprising six-legged, usually-winged forms such as beetles, bugs, bees, flies and so forth, but also to other allied classes of arthopods whose members are wingless and may or may not have more or fewer than six legs, such as spiders, mites, ticks, centipedes, worms, nematodes, and the like.

The novel organophosphorus derivatives of cyclic sulfones of this invention offer several unexpected advantages over comparable or related compositions of the prior art. For example, the compositions of this invention are potent contact and systemic insecticides at low levels of concentration. Thus, the material can be applied to the root areas of plants and by absorption into the plants through the roots, the pests are controlled through contact with the plants. A specific method of systemic control is in the coating of seeds with the compounds of this invention prior to planting, and then allowing the seeds to germinate. In this way, the pesticide is absorbed into the seedling. Furthermore, this insecticidal activity persists for long periods of time after application. That these structures are insecticidal at all is both unexpected and surprising in view of the relative inactivity as insecticides of those compounds wherein X is hydrogen rather than any of the designated substituents. The fact that the presence of this hydrogen atom on this position of the molecule de-activates the compounds as insecticides is considered unusual. The activity of the compositions at these very low concentrations, particularly as contact insecticides, is most advantageous. This level of activity offers the obvious advantage of low cost use, as well as reducing the danger of mammalian toxicity.

An additional important advantage of the inventive compositions as insecticides is that they possess an unusually broad spectrum of activity. That is, the compositions are toxic to a wide variety of insects, including, but not limited to flies, mosquitoes, roaches, beetles, silverfish, aphids, and mites. Many of the related compositions of the prior art are so specific in their insecticidal activity as to require the use of other insecticides to control the normal insect population encountered. This shortcoming often makes the prior art insecticides commercially unsuitable. By contrast, the compositions of this invention are especially suitable for crop and garden use where many different species of insects are commonly encountered.

An additional advantage of these novel compositions is that they may be utilized as pesticides in various grades of purity, ranging from a crude reaction mixture up to a highly refined product. Furthermore, these compositions may be combined with other pesticides, for example, insecticides, such as DDT, methoxychlor, lindane, aldrin, endrin, DDD, BHC, parathion, malathion, methyl parathion, lead and other metallic arsenates, rotenone, allethrin, pyrethrum, nicotine, summer oils, dormant oils, petroleum fractions and distillates, dinitroalkylphenols, dinitrocresols, chlordane, heptachlor, chlorinated terpenes, demeton, other insecticidal organophosphates, thiosphosphates and dithiophosphates, such as those commercially designed as Guthion, Diazinon, Dibrom and others; miticides, such as bis(pentachlorocyclopentadienyl), chlorinated arylsulfonates, quinoxaline trithiocarbonates, chlorinated diarylsulfones and the like, fungicides such as sulfur, dithiocarbamates and N-trichloromethylthio-4-cyclohexene-1,2-dicarboximide to list but a few.

It is also desirable to combine the insecticidal products of this invention with a class of potentiators or synergists known in the insecticidal art as "knockdown agents." These substances are materials which may or may not be insecticidal themselves, but which when combined with other insecticides, will shorten the time required, or reduce the amounts of the insecticide necessary to effect total immobilization (knockdown) or death of the insect to be controlled. Among the large number of synergists which may be used for this purpose are the organic thiocyanates and the water-soluble organophosphates, such as Phosdrin and "Sesoxane" [2-(3,4-methylenedioxyphenoxy)-3,6,9-trioxaudecane], among others.

Yet another advantage of the inventive compositions is that they may readily be formulated as solids or liquids using solid or liquid solvents, vehicles, carriers or extenders.

Suitable diluents are solids or liquids of an inert nature. Illustrative solid diluents include among many others: sawdust, clay, flours, silicas, alkaline earth carbonates, oxides and phosphates, sulfur and the like.

Suitable solvents for liquid formulations include ketones, alcohols, aromatic hydrocarbons, aliphatic hydrocarbons, and petroleum fractions or distillates. Solutions in solvents, such as these may be further dispersed in water by use of emulsifiers.

Whether dissolved or dispersed, suspended or emulsified in a liquid or formulated as a dust or powder or some other solid preparation, the insecticides of this invention may advantageously contain one or more substances known or referred to variously as modifiers, wetting agents, surface active agents, dispersing agents, suspending agents, emulsifying agents, or conditioning agents, said materials being referred to herein generically as adjuvants. Thus, any substance which facilitates formulation, handling and application of the insecticide of this invention may be profitably incorporated to the insecticidal composition. Frequently, said adjuvants enhance or potentiate insecticidal effectiveness. A satisfactory, but not exhaustive list of these substances appears among other places in "Soap and Chemical Specialties," volume 31; No. 7, pages 50–61; No. 8, pages 48–61; No. 9, pages 52–67, and No. 10, pages 38–67 (1955). Another source of this information is Bulletin E–607 of the Bureau of Entomology and Plant Quarantine of the United States Department of Agriculture.

The insecticidal compositions of this invention may be applied as a dust or a spray using among other things, any of the above-mentioned exemplified formulations.

The preferred method of application is a spray using petroleum fractions or distillates as diluents plus one or more conditioning agents as formulation adjuvants. Ordinarily, a typical spray will contain between about 0.001 percent and about ten percent by weight of insecticide with the remaining material being made up largely of solvent with a small amount of adjuvant.

In its process aspects, this invention offers the advantage of an economically feasible process for preparing most of the compositions of this invention in good yield from commercially available starting materials. This involves reacting 3-solfolene with a di-lower-alkoxyphosphinyl sulfenyl chloride or bromide. This reaction is set forth below:

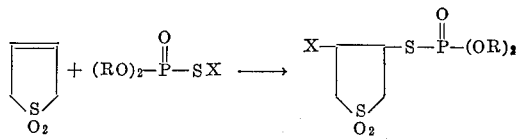

wherein R is a lower alkyl radical of 1 to 4 carbon atoms, and X is bromine or chlorine, preferably chlorine.

The reaction proceeds readily at relatively wide ranges of temperatures, zero degrees to two hundred degrees centigrade, depending upon the reactivity of the reactants used. Where both reactants are liquids, the reaction may be effected without using diluents, although diluents, such as inert aromatic aliphatic hydrocarbons, ketones or alcohols make for smoother reactions.

EXAMPLE 1

*Preparation of O,O-diethyl S-(4-chloro-1,1-dioxotetrahydro-3-thienyl)phosphorothioate*

A mixture of 11.8 grams of 2,5-dihydrothiophene-1,1-dioxide (sulfolene) and forty milliliters of carbon tetrachloride was treated dropwise with 20.5 grams of diethoxyphosphinyl sulfenyl chloride at room temperature. (The sulfenyl chloride was prepared according to the direction of Michalski et al., Chemistry and Industry, page 1199 (1958).) The sulfolene was relatively insoluble in the solvent at the start of the reaction. A one milliliter aliquot of supernatant fluid produces the equivalent of 10.8 milliliters of 0.1 N iodine from potassium iodide. The mixture was heated at reflux overnight and after cooling and removing the small amount of sulfolene remaining, one milliliter of the filtrate produced the equivalent of only 0.25 milliliter of 0.1 N iodine showing substantial completion of the reaction. The filtrate was reduced to dryness, the residue was taken up in benzene, washed with five percent sodium bi-carbonate and again reduced to dryness to give a yellow oil. Analysis calculated for $C_8H_{16}ClO_5PS_2$: P, 9.7 percent; Cl, 10.9 percent. Found: P, 10.0 percent; Cl, 11.0 percent.

O,O-dimethyl S-(4-chloro-1,1-dioxotetrahydro-3-thienyl)phosphorothioate was prepared in a similar manner, however, substituting dimethoxyphosphinyl sulfenyl chloride for the diethoxyphosphinyl sulfenyl chloride.

In a similar manner, using equivalent proportions of other di-lower-alkoxyphosphinyl chlorides or halides, such as dimethyl phosphinyl sulfenyl bromide, diisopropyl phosphinyl sulfenyl chloride, di-n-butyl phosphinyl sulfenyl bromide and methyl, ethyl phosphinyl sulfenyl chloride, the corresponding O,O-di-lower-alkyl S-(4-halo-1,1-dioxotetrahydro-3-thienyl)phosphorothioates result.

EXAMPLE 2

*Formulations*

A typical emulsifiable concentrate made from the product of Example 1 contains about 25 percent alkyl aryl sulfonates and polyoxyethylene sorbitan esters and an indifferent solvent such as xylene. The following is given for the purpose of illustration.

|  | Parts |
| --- | --- |
| O,O-diethyl S-(4-chloro-1,1-dioxotetrahydro-3-thienyl)phosphorothioate | 40 |
| Atlox 3335 | 3 |
| Atlox 89108 | 1 |
| Xylene | 116 |

A typical granular formulation made from the above toxicant contains a carrier, toxicant and stabilizers:

|  | Parts |
| --- | --- |
| O,O-diethyl S-(4-chloro-1,1-dioxotetrahydro-3-thienyl) phosphorothioate | 2 |
| Urea (100 mesh) | 1 |
| Attaclay LVM (30/60 mesh) | 17 |

A typical seed coating made from the above toxicant contains a carrier such as carbon and a sticker such as methyl Cellosolve (trademark of Union Carbide Corporation for mono- and di-alkyl ethers of ethylene glycol and their derivatives):

|  | Parts |
| --- | --- |
| O,O-diethyl S-(4-chloro-1,1-dioxotetrahydro-3-thienyl) phosphorothioate | 1 |
| Darco G-60 | 3 |

Sticker solution of 2 percent aqueous methyl Cellosolve.

The seeds are wet with the above type of sticker solution and then the toxicant-carrier mixture is coated onto the seed.

In the following examples there will be found evidence of the high toxicity to insects of the compounds of the invention. In some cases, a comparison is made with a typical compound of the art, i.e., a compound lacking the halogen and containing a thionate sulfur instead of a phosphate oxygen.

EXAMPLE 3

*Housefly tests*

Fifty adults of the CSMA (Chemical Specialties Manufacturers Association) strain are sprayed in a two inch by 5 inch diameter stainless steel cage faced on top and bottom with 14 mesh screen. Flies are retained in the cage in which they are sprayed for knockdown observations and 24 hour mortality determinations. Mortality which results from this test may be from residual contact as well as by direct contact spray.

The active ingredients were employed as aqueous emulsions made from the emulsifiable concentrate of Example 2 (or comparable concentrate of comparative compound). The emulsion contained 0.1 percent active ingredient.

*Spider mite tests*

Lima bean plants were infested with fifty to one hundred adults of the strawberry spider mite, *Tetranychus atlanticus*, prior to testing. The infested plants are dipped into the test material and held for five days. Adult mortality was noted.

Systemic insecticidal activity is evaluated by applying 20 milliliters of the sample to the vermiculite substratum of potted pea plants. Forty-eight hours after application the plants are infested with mites and a mortality determination is made after five days.

GREENHOUSE NO. 1

| | Percentage Killed | | |
|---|---|---|---|
| | Housefly 0.1% Conc. | Mite(*Tetranychus atlanticus*) | |
| | | Contact 0.1% Conc. | Systemic 0.1% Conc. |
| 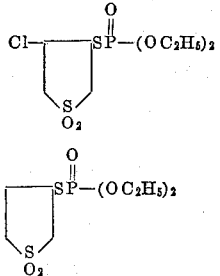 | 88 | 100 | 90 |
| 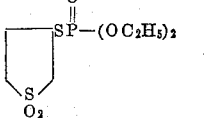 | 0 | 38 | 0 |

EXAMPLE 4

*Mexican bean beetle tests*

Lima bean leaves sprayed on the dorsal and ventral surfaces are offered to larvae of the Mexican bean beetle (late second instar) for a forty-eight hour feeding period. The mortality data are recorded.

*Pea aphid tests*

Adult pea aphids are sprayed and transferred to sprayed pea plants and held for forty-eight hour mortality determinations.

Systemic insecticidal activity is evaluated by applying the sample to the vermiculite substratum of potted pea plants. Forty-eight hours after application the plants are infested with ten adult pea aphids and mortality determination is made after five days.

the chemical emulsion. Each plant is then caged in a Plexiglas piece of tubing supported by a thin aluminum plate and filter paper. The inside of the tube is coated with talcum powder to prevent escape of the aphids. Mortality is then recorded by counting the number of dead aphids and percent mortality determined from the total number.

*Mexican bean beetle*

Primary leaves of lima bean plants are excised and dipped into solutions containing the chemicals. The leaves are allowed to dry by placing the petiole in water using 50 milliliter flasks. After they are dry, they are transferred to paper cups inserting the petiole through a small hole at the bottom of the cup. The petiole is then kept immersed in water to prevent wilting of the treated leaf. The cup serves then as a chamber for the leaf into which larvae (fourth instar) of the Mexican bean beetle (*Epilachna varivestis* Muls.) are inserted. The cup is covered by a Petri plate top to prevent escape of the insects. Mortality of the larvae is recorded after 48 hours.

RESULTS OF TESTING AGAINST APHIDS AND MEXICAN BEAN BEETLES AT GREENHOUSE #2

| Insect | Percent Killed (at indicated concentrations of active compound) | | | | | | |
|---|---|---|---|---|---|---|---|
| | .05% | .025% | .0125% | .062% | .031% | .015% | .008% |
| Aphid | 100 | 100 | 100 | 100 | 100 | 100 | 100 |
| Mexican Bean Beetle | 100 | 100 | 100 | 100 | | | |

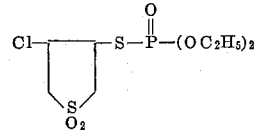

GREENHOUSE #1

| | Percent Killed | | | | | | | | |
|---|---|---|---|---|---|---|---|---|---|
| | Mexican Bean Beetle | | | Pea Aphid | | | | | |
| | Concentration | | | Contact Concen. | | | Systemic Concen. | | |
| | .05% | .01% | .005% | .05% | .01% | .005% | .05% | .01% | .005% |
| 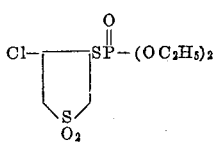 | 100 | 60 | 50 | 100 | 100 | 50 | 100 | 50 | 26 |
| 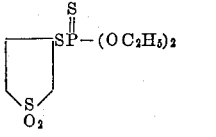 | 0 | 0 | 0 | 20 | 0 | 0 | 0 | 0 | 0 |

EXAMPLE 5.—SPRAY TESTS (INSECTICIDES)

*Aphid test*

Ten-day-old nasturtium plants are infested with black bean aphids (*Aphis fabae* Scop.) so that the two first leaves have from 50 to 100 aphids. The infested plants are then sprayed on a turntable with 100 milliliters of In a similar manner, O,O-dimethyl S-(4-chloro-1,1-dioxotetrahydro-3-thienyl)phosphorothioate was formulated and tested by spraying on nasturtium plants infested with aphids. A concentration of .0007% of the compound was employed. A 100% kill of aphids resulted within 48 hours.

While I have given specific illustrations of compositions, intermediates therefor, processes for making these materials, and of certian uses therefor, in this specification, it is to be understood that various other modifications can be made by one of ordinary skill in this art without departing from the scope of my invention and I do not want to be limited to same, except as defined in the appended claims.

What is claimed is:
1. A method of controlling pests which comprises applying to a locus to be treated an effective amount of

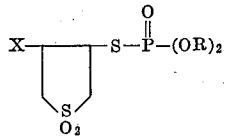

wherein X is a halogen selected from the group consisting of bromine and chlorine and the R's are independently selected from lower alkyl radicals.

2. A method according to claim 1 wherein X is chlorine.

3. A method according to claim 1 wherein both R's are ethyl radicals.

4. A method of controlling insects which comprises applying to a locus to be treated an effective amount of

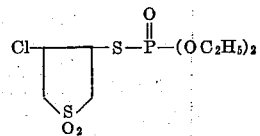

5. A method of controlling insects which comprises applying to a locus to be treated, an effective amount of

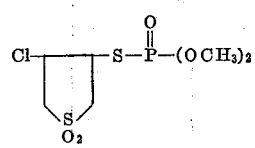

No references cited.

LEWIS GOTTS, *Primary Examiner.*
SHEP K. ROSE, *Assistant Examiner.*

UNITED STATES PATENT OFFICE
CERTIFICATE OF CORRECTION

Patent No. 3,288,671                          November 29, 1966

Sheldon B. Greenbaum

It is hereby certified that error appears in the above numbered patent requiring correction and that the said Letters Patent should read as corrected below.

Column 5, lines 1 to 22, the second formula should appear as shown below instead of as in the patent:

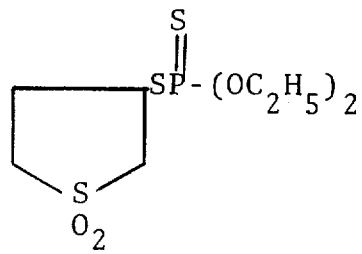

Signed and sealed this 24th day of October 1967.

(SEAL)
Attest:

EDWARD M. FLETCHER, JR.                        EDWARD J. BRENNER
Attesting Officer                                Commissioner of Patents